(12) United States Patent
Rahman et al.

(10) Patent No.: US 8,058,765 B2
(45) Date of Patent: Nov. 15, 2011

(54) METHODS AND APPARATUS FOR A BAR-WOUND STATOR WITH ROTATED CONDUCTORS

(75) Inventors: Khwaja M. Rahman, Troy, MI (US); Edward L. Kaiser, Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/488,376

(22) Filed: Jun. 19, 2009

(65) Prior Publication Data

US 2010/0320864 A1  Dec. 23, 2010

(51) Int. Cl.
*H02K 19/00* (2006.01)
(52) U.S. Cl. .................. 310/201; 310/216.069
(58) Field of Classification Search .......... 310/201, 310/208, 216.069, 216.071, 254.1
See application file for complete search history.

(56) References Cited

U.S. PATENT DOCUMENTS

| | | | | |
|---|---|---|---|---|
| 1,300,308 | A * | 4/1919 | Walker | 363/150 |
| 1,571,914 | A * | 2/1926 | Fletcher | 310/264 |
| 1,799,021 | A * | 3/1931 | Rosen et al. | 310/208 |
| 2,085,099 | A * | 6/1937 | Jones | 310/225 |
| 3,590,301 | A * | 6/1971 | Woydt | 310/269 |
| 3,600,618 | A * | 8/1971 | Nicholas et al. | 310/216.069 |
| 6,218,754 | B1 * | 4/2001 | Alekperov et al. | 310/179 |

* cited by examiner

*Primary Examiner* — Dang D Le
(74) *Attorney, Agent, or Firm* — Ingrassia Fisher & Lorenz P.C.

(57) ABSTRACT

A bar-wound stator includes a plurality of bar-type conductors disposed within the plurality of slots, wherein, within each slot, at least one of the bar-type conductors has an orientation that differs from the remaining bar-type conductors within that slot by a predetermined angle. For example, conductors with rectangular cross-sections can be inserted such that the conductors closest to the inner surface of the stator are rotated ninety degrees with respect to the remaining conductors.

11 Claims, 2 Drawing Sheets

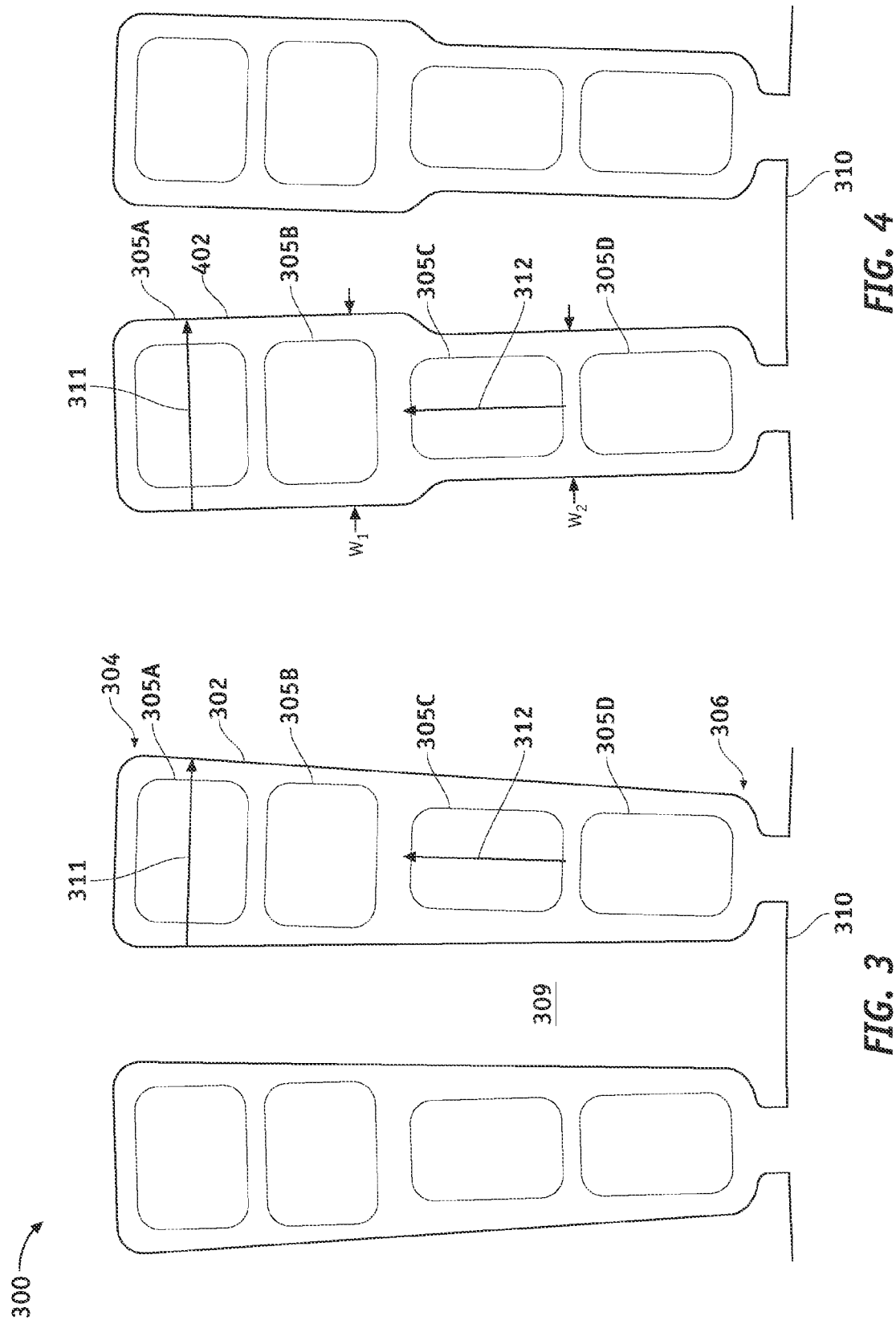

METHODS AND APPARATUS FOR A BAR-WOUND STATOR WITH ROTATED CONDUCTORS

TECHNICAL FIELD

The present invention generally relates to electrical motors such as those used in connection with hybrid vehicles, and more particularly relates to bar-wound stators used in connection with such motors.

BACKGROUND

Traditional distributed motor windings use multiple turns of round wire (e.g., stranded magnet wire) and connections to achieve the desired connectivity. With these machines, the final windings and connections are typically formed by a press-die to produce the final shaped end-turns of the motor. As shown in FIG. 1, for example, a typical stranded wire stator slot configuration 100 within a stator core 109 includes a slot 102 that tapers slightly as it progresses from one end 106 (the end closest to the inner surface 110) to the opposite end 104, such that the stator teeth have parallel sides. The stranded wire (not illustrated) is then wound within slot 102.

In contrast, referring to FIG. 2, the use of hairpin or bar-wound configuration 200 in stators results in superior thermal performance as compared to stranded wire due to its larger end-turn surface area and much improved slot-fill. That is, a number of conductors 205 with generally rectangular cross-sections are inserted within slots 202 such that their sides are parallel, and the width of the slot 202 is relatively invariant as it extends from end 206 to end 204.

Although the latter geometry results in better slot-fill, the available area is limited due to the need for parallel slot faces to accommodate the conductors, as shown. This also results in an unsatisfactorily narrow intertooth distance d near the bottom conductors (adjacent inner surface 210), which can cause high saturation and lower machine torque.

Accordingly, it is desirable to provide improved bar-wound stator designs. Other desirable features and characteristics of the present invention will become apparent from the subsequent detailed description and the appended claims, taken in conjunction with the accompanying drawings and the foregoing technical field and background.

SUMMARY

In accordance with one embodiment, a bar-wound stator (e.g., a stator used in conjunction with a traction motor) includes a stator core having an inner surface; a plurality of slots within the stator core, the plurality of slots extending generally radially outward from the inner surface; and a plurality of bar-type conductors disposed within the plurality of slots, wherein, within each slot, at least one of the bar-type conductors has an orientation that differs from the remaining bar-type conductors within that slot by a predetermined angle (e.g., 90 degrees).

A method of manufacturing an electric machine in accordance with one embodiment includes: providing a stator core having an inner surface; forming a plurality of slots within the stator core such that the slots extend generally radially outward from the inner surface; and inserting a plurality of bar-type conductors within the plurality of slots, wherein, within each slot, at least one of the bar-type conductors has an orientation that differs from the remaining bar-type conductors within that slot by a predetermined angle.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

FIG. 3 is a cross-sectional overview of a stator slot in accordance with one embodiment of the invention; and FIG. 4 is a cross-sectional overview of a stator slot in accordance with an alternate embodiment of the invention.

DETAILED DESCRIPTION

Figures 1, 2:
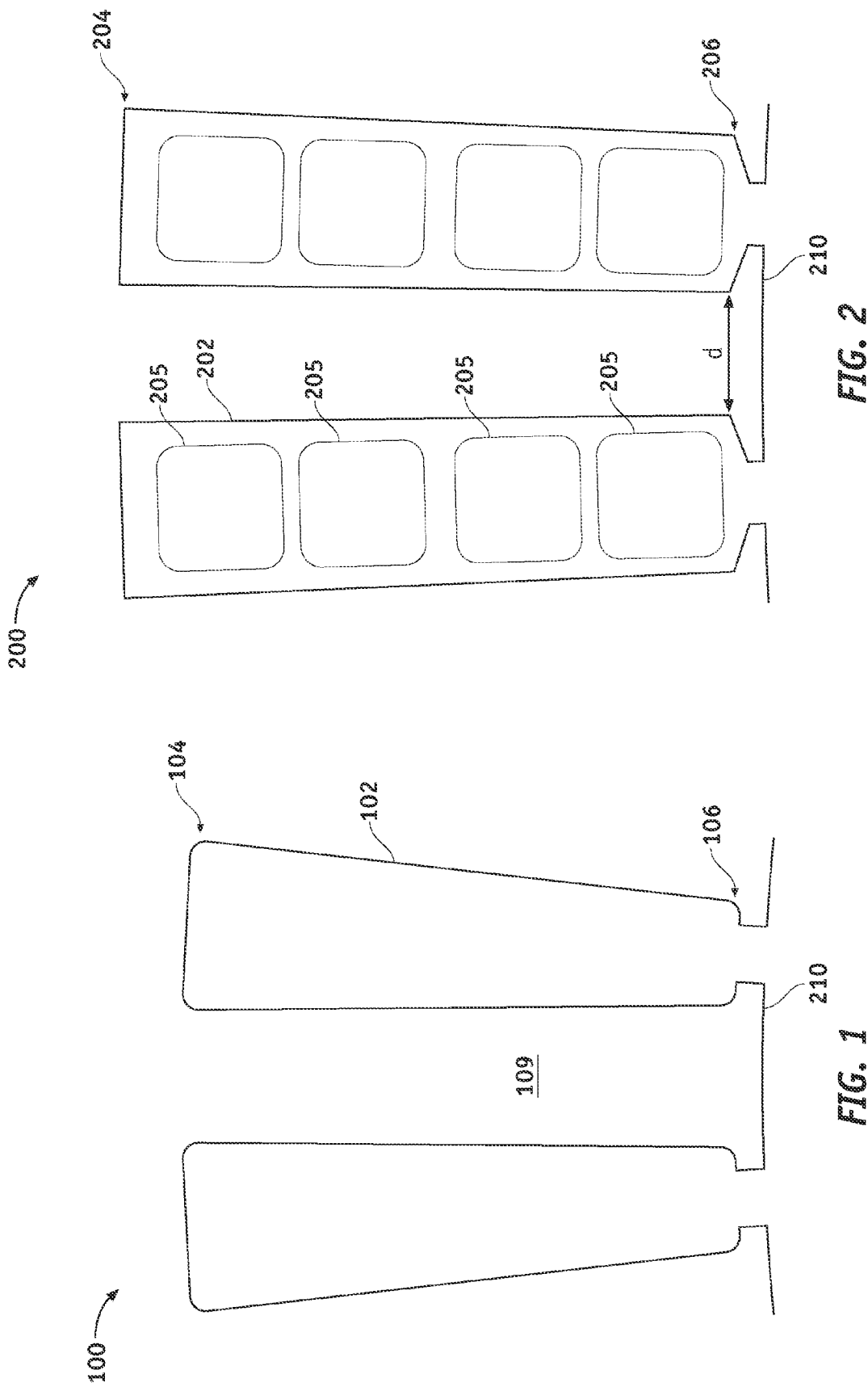
FIG. 1 is a cross-sectional overview of a traditional stranded wire stator slot.
FIG. 2 is a cross-sectional overview of a traditional stator slot for a bar-wound stator.

The following detailed description is merely illustrative in nature and is not intended to limit the invention or the application and uses of the invention. Furthermore, there is no intention to be bound by any expressed or implied theory presented in the preceding technical field, background, brief summary or the following detailed description. The invention may be described herein in terms of functional and/or logical block components and various processing steps. It should be appreciated that such block components may be realized by any number of hardware, software, and/or firmware components configured to perform the specified functions. For the purposes of conciseness, conventional techniques and systems related to electrical motors, stators, windings, magnetism, and the like will not be described herein.

In general, the present invention relates to an improved bar-wound stator slot design in which one or more of the conductors—e.g., the two conductors closest to the rotor, or "bottom conductors"—are generally rotated a predetermined amount (e.g., 90 degrees) with respect to the remaining conductors in the slot.

FIG. 3 depicts a bar-wound stator configuration 300 in accordance with one embodiment. As shown, stator configuration 300 generally includes a stator core 309 having an inner surface 310. A number of slots 302 are formed within the stator core 309 and extend generally radially outward from inner surface 310. Stator core 309 may be manufactured from any number of components and using any conventional stator material known in the art.

A number of bar-type conductors 305 are inserted or otherwise disposed within the plurality of slots 302. As is known, the conductors 305 are formed by inserting hairpins in each slot 302. After insertion, the hair-pin legs (not illustrated) are bent outward to allow welded connections from one hair pin to another. This way the bar-wound stator winding is formed in a wave winding pattern.

As mentioned previously, in accordance with one aspect of the present invention, at least one of the bar-type conductors 305 in each slot 302 has an orientation that differs from the remaining bar-type conductors within that slot by a predetermined angle. In the illustrated embodiment, for example, each of the conductors 305 is distributed radially (spaced equally or unequally along a radial line) and has a rectangular cross-section with a major axis (311, 312) defining the orientation of that rectangular region. The predetermined angle is then, in the illustrated embodiment, approximately ninety degrees.

Preferably, within each slot 302, one or more of the bar-type conductors closest to inner surface 310 (e.g., the "bottom" conductors) has a major axis 312 that is substantially radial with respect to stator core 309. In the illustrated embodiment, for example, each of the slots 302 contains four bar-type conductors 305 (i.e., 305A-D). Conductors 305A and 305B have major axes 311 that are generally perpendicular to major axes 312 of conductors 305C and 305D. That is, major axes 311 are generally tangential, as opposed to radial, with respect to core 309. Stated another way, conductors 305C and 305D are rotated 90 degrees with respect to 305A and 305B.

The embodiment shown in FIG. 3 includes slots 302 with generally linear sides that taper slightly from end 304 to end 306. The orientation of conductors 305C and 305D allow this tapering (compare, for example, to FIG. 2). Thus, by rotating one or more of the bottom conductors 305, the resulting configuration results in more effective usage of the stator iron core (less saturation near the tooth bottom and the stator back iron), possibly more copper area, and allows the sides of each slot 302 to be closer to radial (as shown in FIG. 1), rather than parallel.

The conductor shape, slot shape, and motor air-gap radius will typically be optimized to achieve the desired slot area without restricting tooth flux, as is known in the art. In one embodiment, conductors 305 are rectangular with an aspect ratio of about 1:20 to 1:5.

Furthermore, slots 302 need not have simple rounded quadrilateral cross-sections as illustrated. Slots 302 may have any shape deemed suitable under any given set of design objectives. Referring to FIG. 4, in an alternate embodiment, each slot 402 has a width $w_1$ adjacent to conductors 305C and 305D, which have radial major axes 312, and a second width $w_2$ adjacent to the remaining bar-type conductors (305, 305B) within each slot 402.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient edifying road map for implementing the described embodiment or embodiments. It should be understood that various changes can be made in the function and arrangement of elements without departing from the scope of the invention and the legal equivalents thereof.

What is claimed is:

1. A bar-wound stator comprising:
    a stator core having an inner surface;
    a plurality of slots within the stator core, the plurality of slots extending generally radially outward from the inner surface, the plurality of slots having a minimum slot width adjacent the inner surface, and a maximum slot width at an outmost slot; and
    a plurality of bar-type conductors disposed within the plurality of slots, wherein, within each slot, at least one of the bar-type conductors has an orientation that differs from the remaining bar-type conductors within that slot by a predetermined angle.

2. The bar-wound stator of claim 1, wherein each of the plurality of bar-type conductors has a rectangular cross-section with a major axis defining the orientation, and wherein the plurality of bar-type conductors are distributed radially.

3. The bar wound stator of claim 2, wherein the predetermined angle is approximately ninety degrees.

4. The bar wound stator of claim 3, wherein, within each slot, the bar-type conductor closest to the inner surface has a major axis that is substantially radial with respect to the stator core.

5. The bar wound stator of claim 4, wherein each of the slots contains at least two bar-type conductors.

6. The bar wound stator of claim 5, wherein each of the slots contains four bar-type conductors, and wherein the major axes of the bar-type conductors closest to the inner surface are aligned generally radially.

7. The bar wound stator of claim 4, wherein each slot has a first width adjacent to the bar-type conductors having radial major axes, and a second width adjacent to the remaining bar-type conductors within each slot, further wherein the first width is less than the second width.

8. A traction motor configured to be used in connection with a vehicle, the traction motor comprising a rotor and a stator in magnetic interaction with each other, wherein the stator comprises:
    a stator core having an inner surface;
    a plurality of slots within the stator core, the plurality of slots extending generally radially outward from the inner surface and having a minimum slot width adjacent the inner surface, and a maximum slot width at an outmost slot; and
    a plurality of bar-type conductors disposed within the plurality of slots, each bar-type conductor having a generally rectangular cross-section and a major axis;
    wherein, within each slot, at least one of the bar-type conductors has a major axis orientation that differs from the remaining bar-type conductors within that slot by approximately ninety degrees.

9. The traction motor of claim 8, wherein, within each slot, the bar-type conductor closest to the inner surface has a major axis that is substantially radial with respect to the stator core.

10. The traction motor of claim 8, wherein each slot has a first width adjacent to the bar-type conductors having radial major axes, and a second width adjacent to the remaining bar-type conductors within each slot, further wherein the first width is less than the second width.

11. A bar-wound stator comprising:
    a stator core having an inner surface; and
    a plurality of slots within the stator core, the plurality of slots having substantially the same aspect ratio and extending generally radially outward from the inner surface, wherein the plurality of slots includes:
        a first set of slots proximate the inner surface, the first set of slots having a generally radial major axis orientation and a first slot width; and
        a second set of slots distal from the inner surface, the second set of slots having a generally tangential major axis orientation and a second slot width that is greater than the first slot width.

* * * * *